UNITED STATES PATENT OFFICE.

CALEB A. LIBBY, OF LA CYGNE, KANSAS.

IMPROVEMENT IN FURNITURE-POLISHES.

Specification forming part of Letters Patent No. 138,262, dated April 29, 1873; application filed April 7, 1873.

*To all whom it may concern:*

Be it known that I, CALEB A. LIBBY, of La Cygne, Linn county, Kansas, have invented a certain compound called Furniture-Polish, of which the following is a specification:

My furniture-polish is composed of the following ingredients: Two (2) gallons raw linseed-oil, one and one-half (1½) gallon turpentine, one-fourth (¼) pound dragon's blood, one-fourth (¼) pound rosin, one-fourth (¼) pound alum, two (2) ounces iodide potassium, one-half (½) pound sulphuric acid, eight (8) ounces nitric acid; using avoirdupois weight for the dragon's blood, rosin, alum, iodide potassium, and sulphuric acid; common wine or liquid measure for the oil and turpentine; apothecaries' measure for the nitric acid.

*Manner of Mixing.*

First put the oil and turpentine into an earthen vessel; then pulverize the dragon's blood, rosin, alum, and iodide potassium to a fine powder. Stir this powder slowly into the oil and turpentine; then add the sulphuric acid, slowly stirring continually. Let this mixture stand ten hours; then add the nitric acid. Slowly stir the mixture while adding. Apply with a sponge or cloth.

*Claim.*

I claim—

A composition formed of ingredients or substances compounded in the proportions and in the manner as herein specified, for the purposes set forth.

To the above specification of my improved furniture-polish I hereunto set my hand this 17th day of March, 1873.

CALEB ANCIL LIBBY.

Witnesses:
J. E. MOORE,
GEO. L. PRATT.